(12) United States Patent
Galstian

(10) Patent No.: US 12,411,380 B2
(45) Date of Patent: Sep. 9, 2025

(54) ELECTRODE STRUCTURE FOR FRESNEL LENS DEVICE

(71) Applicant: UNIVERSITÉ LAVAL, Québec (CA)

(72) Inventor: Tigran Galstian, Québec (CA)

( * ) Notice: Subject to any disclaimer, the term of this patent is extended or adjusted under 35 U.S.C. 154(b) by 0 days.

(21) Appl. No.: 18/539,829

(22) Filed: Dec. 14, 2023

(65) Prior Publication Data

US 2024/0111184 A1  Apr. 4, 2024

Related U.S. Application Data

(63) Continuation of application No. PCT/CA2022/050958, filed on Jun. 15, 2022.

(60) Provisional application No. 63/211,406, filed on Jun. 16, 2021.

(51) Int. Cl.
| | |
|---|---|
| *G02F 1/1335* | (2006.01) |
| *G02B 3/08* | (2006.01) |
| *G02F 1/1343* | (2006.01) |
| *G02F 1/29* | (2006.01) |

(52) U.S. Cl.
CPC ......... *G02F 1/133526* (2013.01); *G02B 3/08* (2013.01); *G02F 1/134309* (2013.01); *G02F 1/13439* (2013.01); *G02F 1/294* (2021.01)

(58) Field of Classification Search
CPC ......... G02F 1/133526; G02F 1/134309; G02F 1/13439; G02F 1/294; G02B 3/08; G02C 7/083; G02C 2202/12
See application file for complete search history.

(56) References Cited

U.S. PATENT DOCUMENTS

| | | | |
|---|---|---|---|
| 3,741,629 A | 6/1973 | Kahn | |
| 8,421,990 B2 | 4/2013 | Biring | |
| 9,201,285 B2 | 12/2015 | Galstian et al. | |
| 2011/0025955 A1* | 2/2011 | Bos | G02F 1/29 349/95 |
| 2013/0063691 A1 | 3/2013 | Takama et al. | |
| 2014/0028932 A1* | 1/2014 | Kuo | G02B 30/27 349/200 |

(Continued)

FOREIGN PATENT DOCUMENTS

| | | |
|---|---|---|
| EP | 2297747 A2 | 3/2011 |
| KR | 20120124344 A | 11/2012 |
| RU | 2719341 C1 | 4/2020 |

(Continued)

OTHER PUBLICATIONS

Loktev, M.Y., et al., Wave front control systems based on modal liquid crystal lenses. Review of scientific instruments, 2000. 71(9): p. 3290-3297.

(Continued)

*Primary Examiner* — Mariam Qureshi
(74) *Attorney, Agent, or Firm* — Anglehart et al.

(57) ABSTRACT

A liquid crystal gradient index device has two opposed substrates containing liquid crystal, a plurality of linear serpentine electrode sections forming a first arrangement on a first one of the substrates, and an opposed electrode on a second one of the substrates. The first arrangement comprises contact points for each serpentine electrode section each operable to receive a driving signal for imparting an electric field profile to form a portion of a linear Fresnel lenslet within the liquid crystal. An improved gradient index Fresnel lens is provided.

26 Claims, 15 Drawing Sheets

(56) References Cited

U.S. PATENT DOCUMENTS

2014/0055716 A1    2/2014  Zhang
2019/0187339 A1*  6/2019  Shibuya .................... G02F 1/29

FOREIGN PATENT DOCUMENTS

| WO | 2016/082031 A1 | 6/2016 |
|----|----------------|--------|
| WO | 2017/040067 A1 | 3/2017 |
| WO | 2017/041167 A1 | 3/2017 |

OTHER PUBLICATIONS

Andrew K. Kirby, et al., Liquid crystal multi-mode lenses and axicons based on electronic phase shift control. Optics Express, vol. 15, No. 21, Oct. 17, 2007.

Algorri et al., Modal liquid crystal array of optical elements. published in Oct. 21, 2013 | vol. 21, No. 21 | DOI:10.1364/OE.21.024809 | Optics Express, 24809-24818.

L. Begel and T. Galstian, Dynamic generation of non-diffracting beams by using an electrically variable liquid crystal lens, 441, pp. 127-131, Optics Communications, 2019.

Li, L., D. Bryant, and p. J. Bos, Liquid crystal lens with concentric electrodes and inter-electrode resistors. Liquid Crystals Reviews, 2014. 2(2): p. 130-154.

J. Robertson, High dielectric constant oxides, Eur. Phys. J. Appl. Phys. 28, 265-291 (2004)).

International application No. PCT/CA2022/050958 International Search Report dated Oct. 12, 2022.

International application No. PCT/CA2022/050958 Search Strategy dated Oct. 12, 2022.

International application No. PCT/CA2022/050958 Written Opinion of the International Searching Authority dated Oct. 12, 2022.

International application No. PCT/CA2022/050959 International Search Report dated Oct. 3, 2022.

International application No. PCT/CA2022/050959 Search Strategy dated Oct. 3, 2022.

International application No. PCT/CA2022/050959 Written Opinion of the International Searching Authority dated Oct. 3, 2022.

Corresponding European application No. 22823732.7 extended European search report dated Apr. 11, 2025.

* cited by examiner

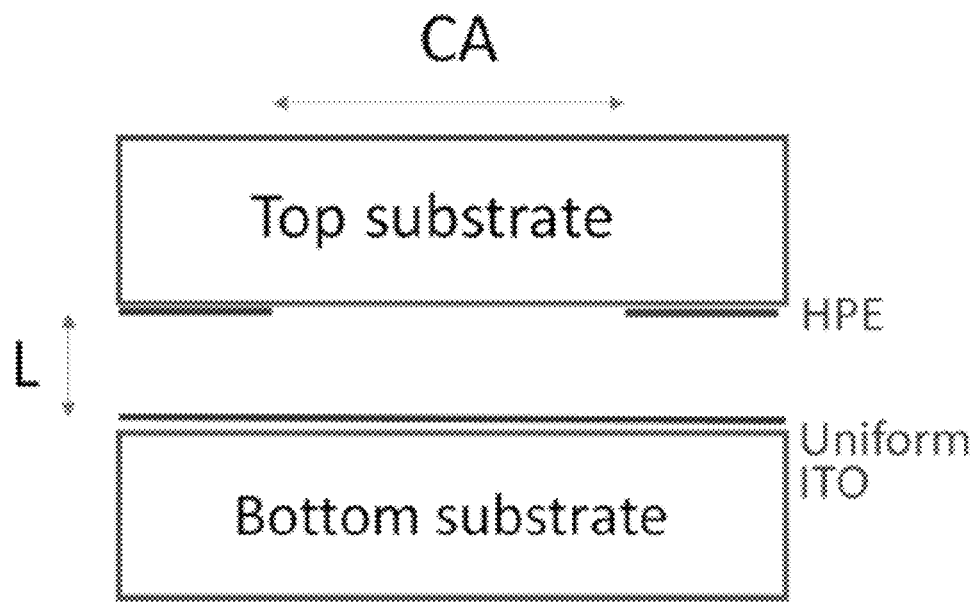
Fig.1a. Side view (prior art)
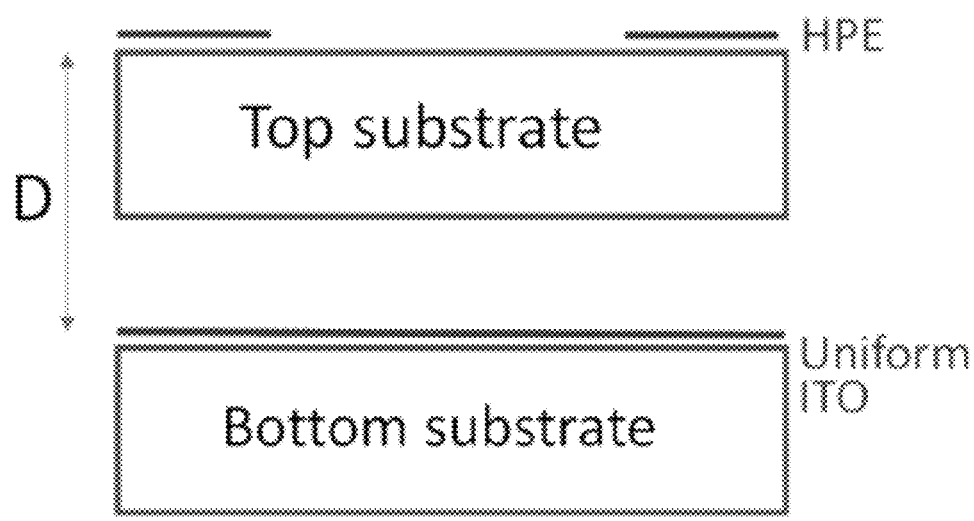
Fig.1b. Side view (prior art)

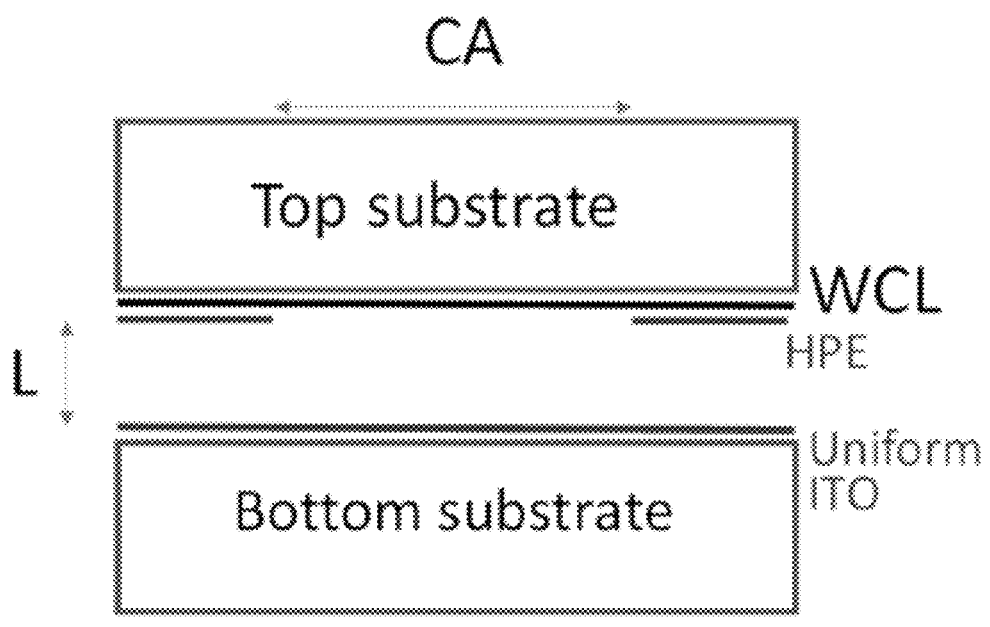
Fig.2. Side view (prior art)

ELECTRODE STRUCTURE FOR FRESNEL LENS DEVICE

CROSS-REFERENCE TO RELATED APPLICATIONS

This application is a continuation of PCT application serial number PCT/CA2022/050958, filed Jun. 15, 2022, designating the US, that claims priority from U.S. Provisional Patent Application 63/211,406 filed Jun. 16, 2021, the contents of which are hereby incorporated by reference.

TECHNICAL FIELD

The present patent application relates to liquid crystal optical devices.

BACKGROUND

Optical gradient index devices are well known in the prior art, e.g., gradient index lenses and prisms (Moore, D. T., *Gradient-index optics: a review*. Applied Optics, 1980. 19(7): p. 1035-1038.). Making these devices adaptable (enabling the dynamic change of their gradient) can increase significantly their functionality and efficiency. This would require optical materials that are sensitive to external stimuli. Various materials, including liquid crystals (LC) are sensitive to such stimuli, e.g., electric or magnetic fields (de Gennes, P.-G. and J. Prost, The physics of liquid crystals. Oxford University Press, USA, 1995. 2: p. 4.). Thus, we could use electric field gradients to obtain the desired profile of refractive index by using LC materials (e.g., to build an electrically tunable LC lens or TLCL).

Indeed, different techniques have been developed to obtain such a gradient of electric field. One of the most straightforward ways is the use of patterned (circular, to obtain a lens, or linear, to obtain a prism) electrodes in a sandwich device (made of two substrates) containing the LC material. In the case of a lens-type device, one of its substrates is usually covered by a uniform transparent electrode (indium tin oxide or ITO), while the second one has a hole patterned electrode (HPE), FIG. 1a. In this case, the electric field will be strong in the periphery (where the HPE is facing the uniform ITO electrode) and will be decreasing when we consider positions closer to the center of the device (far from the HPE). The electric field's decrease will be gradual at distances comparable with the separation D (shown on FIG. 1b) of two electrode planes (thanks to the so-called «fringing field» effect), but it will be significant if the diameter of the HPE (or the clear aperture, CA, of the device, shown on FIG. 1a) is much larger compared to the D (in FIG. 1a, we have a case when D=L, where L is the thickness of the LC layer). Thus, the electric field's profile, the reaction of the LC and the corresponding profile of the refractive index gradient will be defined by the ratio of CA over D. In fact, it was shown that the best ratio R=CA/D should be at the order of 2.5 to have a soft change of the electric gradient allowing the generation of an optical gradient index lens with acceptable aberrations (Sato, S., *Applications of liquid crystals to variable-focusing lenses*. Optical Review, 1999. 6(6): p. 471-485.)

However, there are several limitations here: the choice of the thickness L of the LC is usually limited (L must be relatively small because of light scattering and relaxation time requirements) and the separation of electrodes D must be as small as possible to limit voltages U required to generate enough electric field E (where E=U/D) to reorient LC molecules. This limitation is related to the electrical power consumption of the device which is proportional to the square of the voltage applied to the device. For example, FIG. 1B demonstrate a case, where, instead of increasing the L, the top electrode layer is shifted further to keep the ratio R optimal (for a given CA), but further are these electrodes higher will be the voltage to drive the device.

This is the reason why we cannot use the «fringing field» approach for relatively large values of CA, e.g., in the range from 0.1 mm to 10 mm, or specifically, in the range from 0.5 mm to 5 mm, used for imaging, ophthalmic and augmented reality applications. It may be useful to notice that such TLCLs or LC gradient index (LC-GRIN) lenses can generally be characterized as having an optical power that is inversely proportional to the aperture CA. In some optical imaging systems, the aperture must be much larger. Thus, the traditional LC-GRIN lens can not provide a noticeable optical power variation range. This is limiting the application of these devices in systems with large CA. Solutions have been proposed to increase the optical power at larger apertures in LC-GRIN lenses, such as to have the same lens operate as a both negative lens and then as a positive lens. However, the clear aperture size requirements remain still a problem if we try to generate a tunable lens over the entire CA.

Various solutions have been proposed to build devices with millimetric range of CA. One approach uses a high resistivity or weakly conductive layer (WCL) next to the HPE to help further propagate the fringing field towards the center of the device (Kahn, F., Electronically variable iris or stop mechanisms. 1973, US Patent; Loktev, M. Y., et al., Wave front control systems based on modal liquid crystal lenses. Review of scientific instruments, 2000. 71(9): p. 3290-3297.), FIG. 2. However, for millimetric size CAs, the sheet resistance value Rs for such a layer is in the Mega Ohm (per square) region and it is extremely difficult to produce uniform layers with such Rs in a reproducible way and to ensure that they are environmentally stable (since very often a non-stochiometric/incomplete oxidation of metals must be maintained to obtain such Rs values).

The use of a number of individually-driven (FIG. 3a) or resistively interconnected (FIG. 3b) concentric ring electrodes has been proposed without the use of any WCL, however, this design is complex to produce and to control dynamically, and also leads to some aberrations at the connection points for each ring electrode and can result in artifacts due to the steps in electric field caused by the discrete ring electrodes.

Capacitive coupling between ring electrodes has also been proposed to simplify the drive of the electrodes by providing a single drive signal in the absence of any resistive interconnection to thus remove the aberrations at the connection points. This is taught in U.S. Pat. No. 9,201,285. With capacitive coupling, the gaps between the ring electrodes are covered by coupling electrodes at different levels (two electrode layers being separated by a dielectric isolation layer), such that the electric field gradient is smaller than in the case of discrete concentric ring electrodes that provide zero-potential gaps between the rings. However, this design is more difficult to build and can still lead to some artifacts due to the steps in electric field caused by the electrode structure.

In U.S. Pat. No. 8,421,990, there is taught that a spiral electrode can be arranged for a circular lens in which the resistance of the spiral electrode can be used over its length to reduce voltage, thus providing a suitable electric field spatial distribution over the aperture, and without needing to provide any WCL. Provided that the spacing or pitch between turns of the spiral electrode are small enough, the artifacts due to the steps in electric field caused by the discrete turns of the spiral electrode can be insignificant. However, as described in this patent, the ITO stripes must be strongly spaced generating discrete field transitions, light scattering, and lens quality degradation for millimetric lenses. Thus, such an approach will require the use of a transparent electrode having rather high resistance or small enough pitch for this approach to be suitable for millimetric lenses, both requirements remaining significant challenges (see hereafter).

Liquid crystal optical devices are known in the art that dynamically modulate beams. For example, PCT patent application publication WO2017/040067, published on 16 Mar. 2017, describes a variety of optical arrangements including liquid crystal devices that will broaden a beam. In PCT patent application publication WO2016/082031, published on 2 Jun. 2016, a variety of optical arrangements including liquid crystal devices are described for steering a beam.

SUMMARY

Applicant has discovered that the problem of electric field discontinuity due to a discrete electrode arrangement in an LC-GRIN (or TLCL) optical device having a stepped voltage distribution in space can be solved by the use of a different spiral serpentine electrode.

In some embodiments, there is provided a liquid crystal gradient index (LC-GRIN) lens device comprising two opposed substrates containing liquid crystal, a spiral serpentine electrode arrangement on a first one of the substrates, and an opposed electrode on a second one of the substrates. The spiral serpentine electrode arrangement may comprise at least two contact points each operable to receive a driving signal, a first one of the at least two contact points being at an outer radial location and a second one of the at least two contact points being at an inner radial location with a lead connected to the second one of the contacts interrupting turns of the spiral electrode arrangement with steps and returns in the spiral electrode arrangement.

A first broad aspect is a liquid crystal gradient index device comprising: two opposed substrates containing liquid crystal; a spiral serpentine electrode arrangement on a first one of the substrates; and an opposed electrode on a second one of the substrates, wherein the spiral serpentine electrode arrangement includes at least two contact points each operable to receive a driving signal, a first one of the at least two contact points being at an outer radial location and a second one of the at least two contact points being at an inner radial location.

In some embodiments, a lead connected to the second one of the contacts interrupts turns of the spiral electrode arrangement with steps and returns in the spiral electrode arrangement.

In some embodiments, the opposed electrode is a uniform transparent electrode.

In some embodiments, the opposed electrode is a patterned transparent electrode.

In some embodiments, at least one of the spiral serpentine electrodes and the opposed electrode is made of a transparent conductive material.

In some embodiments, the transparent conductive material is one of indium tin oxide, zinc oxide and graphene.

In some embodiments, the liquid crystal is a nematic liquid crystal.

In some embodiments, the spiral serpentine electrode arrangement includes two or more spiral serpentine electrodes, wherein each of the two or more spiral serpentine electrode includes at least two contact points each operable to receive a driving signal (voltages and frequency) and wherein a first one of the two or more spiral serpentine electrode defines a central aperture of the lens device and at least a second one of the two or more spiral serpentine electrode defines at least one outer band in a periphery of the central aperture.

In some embodiments, the spiral serpentine electrode arrangement includes capacitively-coupled electrode segments.

In some embodiments, the spiral serpentine electrode arrangement includes individually driven electrode segments.

In some embodiments, the spiral serpentine structure is deformed to generate almost a free form refractive index distribution.

In some embodiments, the upper part of the spiral serpentine structure is stretched or compressed in the horizontal direction at a given degree (amount), while the lower part of the spiral serpentine structure is stretched or compressed at a different degree in the orthogonal (vertical) direction to generate a refractive index distribution for an electrically tunable progressive eyeglass use with Fresnel type wavefront offsets.

In some embodiments, the lens device further includes a transparent HDCL placed near the spiral serpentine electrode arrangements to extend the fringing field and to reduce the optical losses.

In some embodiments, the role of the HDCL is performed by the use of a high dielectric constant substrate, the alignment layer or by the liquid crystal.

A second broad aspect is a liquid crystal gradient index device comprising: two opposed substrates containing liquid crystal; a plurality of linear serpentine electrode sections forming a first arrangement on a first one of the substrates; and an opposed electrode on a second one of the substrates, wherein the first arrangement includes contact points for each the serpentine electrode section each operable to receive a driving signal for imparting an electric field profile to form a portion of a linear Fresnel lenslet within the liquid crystal.

In some embodiments, the opposed electrode includes a plurality of corresponding uniform electrode sections.

In some embodiments, the opposed electrode includes a plurality of corresponding serpentine electrode sections.

In some embodiments, each electrode sections have at least one external contact to receive the control signal.

In some embodiments, each electrode sections are disrupted and have two external contacts to receive the control signal.

A third broad aspect is a liquid crystal gradient index device comprising: two opposed substrates containing liquid crystal; a transparent spiral serpentine shaped electrode arrangement on a first one of the substrates; and an opposed electrode on a second one of the substrates, wherein the spiral serpentine electrode arrangement includes one external contact point operable to receive a driving signal and at least one electrode of the serpentine electrode arrangement is in proximity of a high dielectric material.

In some embodiments, the second substrate further includes an electrode pattern of a different shape.

In some embodiments, the first substrate is thin and further includes a floating transparent conductive layer on an external surface.

A fourth broad aspect is a device based on one of the above-mentioned electrode structures where the excitation of electrodes allows the generation of cylindrical lens arrays to be used for dynamic focusing and lighting.

A fifth broad aspect is a device based on one of the above-mentioned electrode structures where the excitation of electrodes allows the generation of prism arrays to be used for light steering.

BRIEF DESCRIPTION OF THE DRAWINGS

The invention will be better understood by way of the following detailed description of embodiments of the invention with reference to the appended drawings, in which:

FIG. 1a illustrates a schematic side view of a lens-type device known in the art, having one substrate covered by a uniform transparent electrode and a second one has a hole patterned electrode (HPE), both electrodes being inside of the sandwich.

FIG. 1b illustrates a schematic side view of a lens-type device known in the art having a top electrode HPE layer shifted away (to the external side of the cell) to keep an optimal ratio R between the diameter of the lens CA and the separation of electrodes D by having electrodes spaced apart.

FIG. 2 illustrates a schematic side view of a lens-type device known in the art having a high resistivity or weakly conductive layer (WCL) to help further propagate the fringing field towards the center of the device.

FIG. 5b is an experimental micro photography of the lens with spiral shaped ITO showing the discretization induced light scattering and degradation of its wave front due to the discontinuities of the electric field between ITO electrodes shown in FIG. 5a.

FIG. 6b illustrates a schematic side view of the lens shown in FIG. 6a.

FIG. 7b illustrates a schematic side view of the electrodes shown in FIG. 7a.

FIG. 9b illustrates a schematic of a number of serpentine electrodes providing multiple separated excitation regions on a single substrate of an LC cell in an orthogonal orientation with regards to the embodiment of FIG. 9a.

FIGS. 11A and 11B illustrates orthogonally oriented electrodes of two substrates of an exemplary embodiment of the LC lens device as presented in FIG. 10, including a lens driver, a number of electrode controllers and one or more electrode matrices comprising any number of serpentine electrode structures as presented in FIG. 9a.

DETAILED DESCRIPTION

Figure 3A:
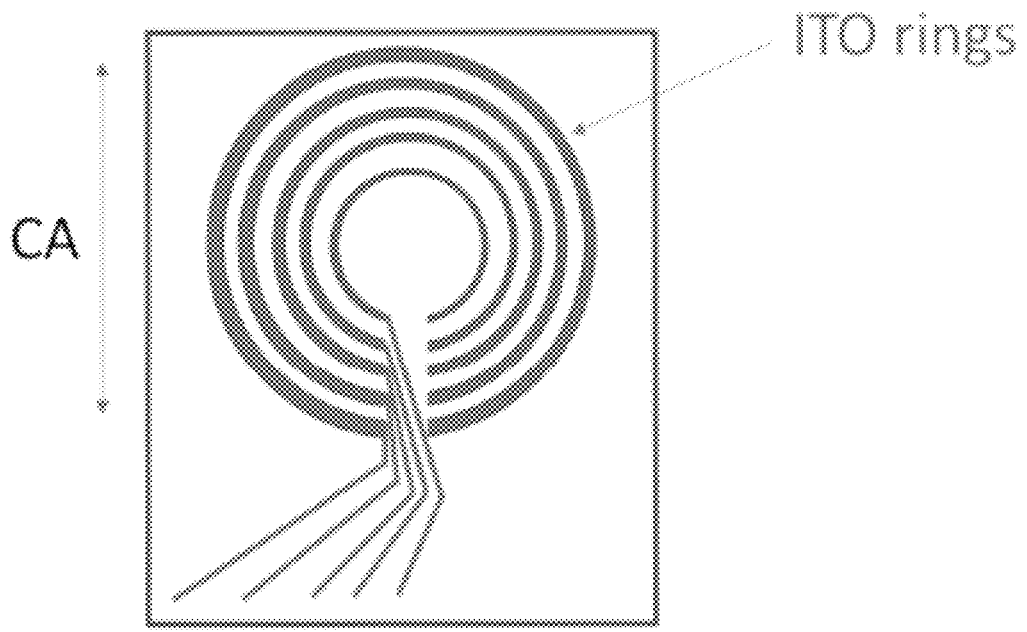
FIG. 3a illustrates a schematic top view of a lens-type device known in the art having multiple concentric electrodes each of them being individually controlled.

FIG. 1a schematically demonstrates an electrically variable LC lens that is built by using a patterned (circular, to obtain a lens, or linear, to obtain a prism) electrode on one of the substrates of a sandwich device containing the LC material. The second substrate of the sandwich is typically covered by a uniform transparent electrode (indium tin oxide or ITO). In the case of a circular lens, the first electrode is hole patterned electrode (HPE).

In this case, the electric field is strong in the periphery of the lens (where the HPE is facing closely the uniform ITO electrode) and is decreasing gradually when we consider positions closer to the center of the device (far from the HPE's internal limit). The reaction of the LC and the corresponding profile of the refractive index gradient will be defined by the ratio R of the clear aperture CA over the separation of electrodes D (in FIG. 1a, we have used D=L, where L is the thickness of the LC layer). It was shown that the desired order of magnitude of R is 2.5.

The above-mentioned approach can be successful in a very narrow range of CA. However, there are several limitations in the case of millimetric ranges: to maintain good optical aberrations, the thickness L of the LC must be increased. However, larger L provides stronger light scattering and longer relaxation times. We could alternatively increase D, but it will increase the electrical power consumption. FIG. 1B demonstrate such a case, where, instead of increasing the L, the top electrode layer is shifted further to keep the ratio R optimal (for a given CA).

This is the reason why we cannot use the «fringing field» approach for relatively large CA values, e.g., in the range from 0.1 mm to 10 mm, or more specifically, in the range from 0.5 mm to 50 mm, used for imaging, ophthalmic and augmented reality applications.

Various solutions have been proposed to build devices with millimetric range of CA. One approach uses a high resistivity or weakly conductive layer (WCL) to help further propagate the fringing field towards the center of the device (Kahn, F., Electronically variable iris or stop mechanisms. 1973, US Patent, Loktev, M. Y., et al., Wave front control systems based on modal liquid crystal lenses. Review of scientific instruments, 2000. 71(9): p. 3290-3297.), FIG. 2. However, for millimetric size CAs, the sheet resistance value Rs for such a layer is in the Mega Ohm (per square) region and it is extremely difficult to produce uniform layers with such Rs in a reproducible way and to ensure that they are environmentally stable (since very often a non-stochiometric/incomplete oxidation of metals must be maintained to obtain such Rs values).

Given that the main challenge (for obtaining the desired profile of electric potential) is related to the design of the substrate with non-uniform (e.g., hole patterned) electrode, we shall further consider various (known and new, proposed here) versions of it (which we could call a «control substrate»), keeping in mind that, usually, we need the opposed substrate also to obtain the final device.

The fabrication of ITO layers is currently well mastered in the industry (see hereafter). Thus, several approaches were proposed to use patterned ITO (without the WCL) to obtain the required gradient of the electric field.

Figure 3B:
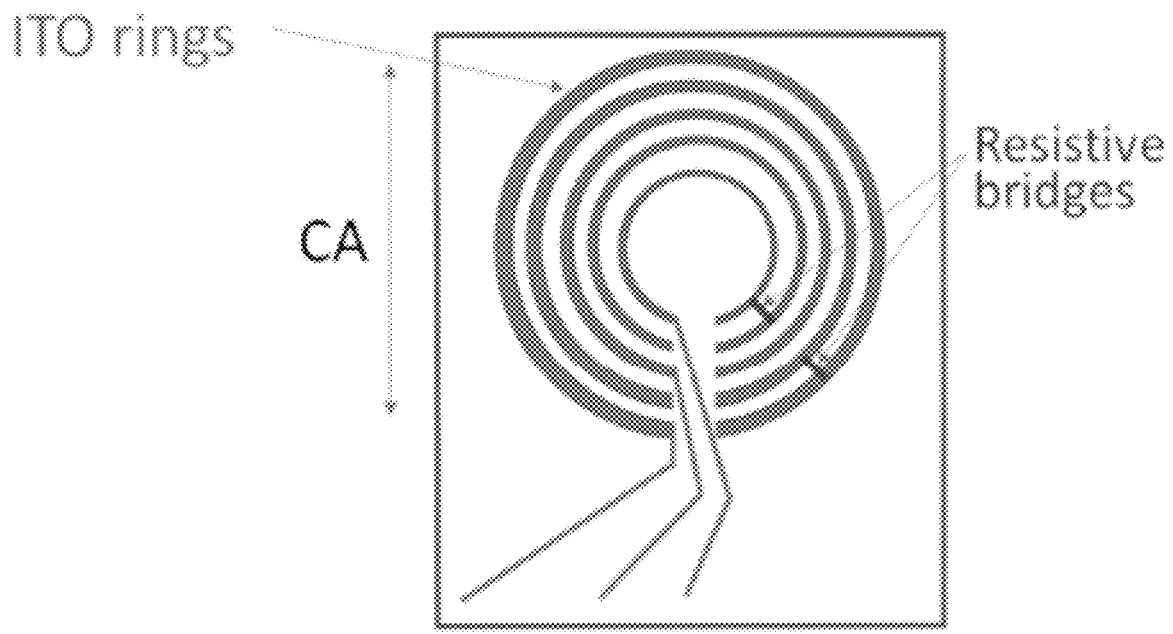
FIG. 3b illustrates a top view of a lens-type device known in the art with concentric electrodes, some of them being individually controlled, while others having resistive bridges.

Thus, one of them uses multiple very closely positioned discrete (up to 80) circular electrodes (Li, L., D. Bryant, and P. J. Bos, Liquid crystal lens with concentric electrodes and inter-electrode resistors. Liquid Crystals Reviews, 2014. 2(2): p. 130-154.), which are controlled individually (like in LC displays, FIG. 3a) or are partially resistively bridged (FIG. 3b). While the use of bridged electrodes reduces the number of individually controlled electrodes, this is still a very costly and complex (both for manufacturing and operation) solution.

Figure 4:
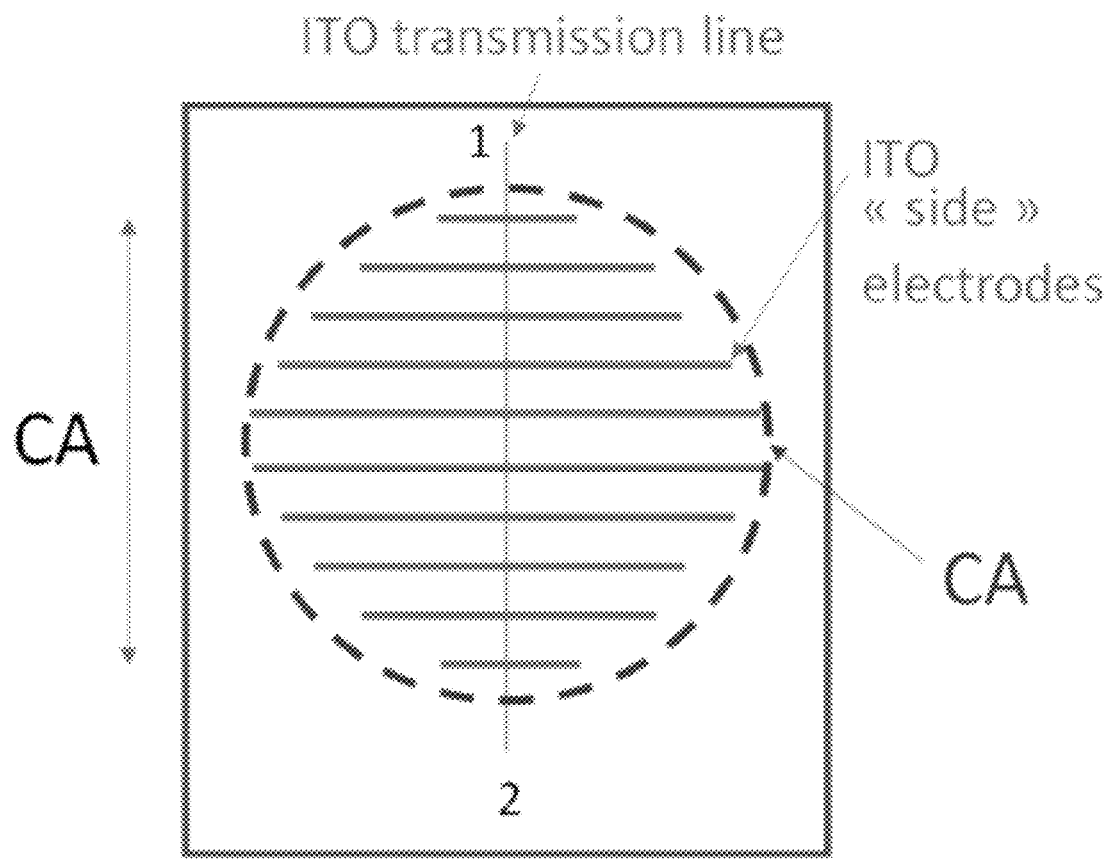
FIG. 4 shows a schematic top view of a voltage divider trans-line liquid crystal lens known in the art having ITO transmission lines and ITO side electrodes.

An alternative technique of using extremely narrow ITO as a very resistive «transmission line» (and phase shifted driving technique) was suggested (J. F. Algorri, N. Bennis, V. Urruchi, P. Morawiak, L. Jaroszewicz, J. M. Sanchez-Pena, Voltage divider trans-line liquid crystal lens, PC20, 15th European Conference on Liquid Crystals, FIG. 4) to propagate the electric potential further towards the center of the device in the desired way (by distributing different values of the electrical potential from the center to the periphery). However, if the resistance of the transmission line is not high enough, the only way to create a spatial profile of electric field will be the "forced" or phase shifted control. In contrast, to obtain a "natural" decrease of the potential (e.g., when one of the contacts is powered, while the second one is floating) for millimetric range devices, the width of a standard ITO «transmission line» (with a Rs value between 50 to 100 Ohm/square) must be sub micrometric, which is extremely difficult to obtain in a reproducible way at the industrial scale. Thus, even for a 0.5 micrometer width of the ITO transmission line, the drop of potential over 10 mm is less than 12%. Thus, the electric potential's modulation depth may be very poor.

Figure 5A:
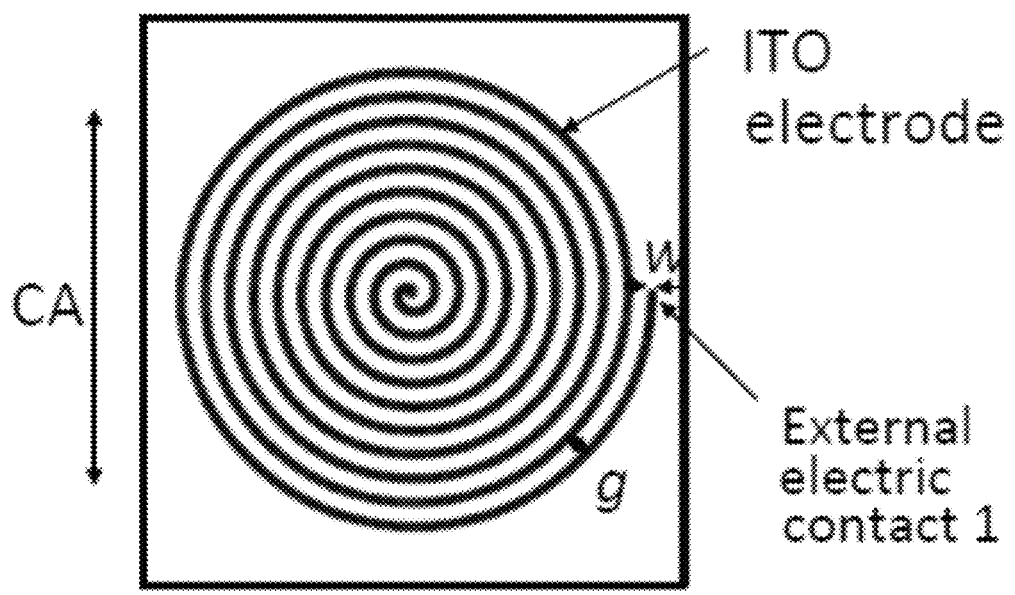
FIG. 5a shows a schematic top view of a liquid crystal lens device known in the art having a spiral ITO electrode with one control electrode (external contact) on one of its surfaces.

Another approach of a spiral shaped ITO electrode was proposed (in U.S. Pat. No. 8,421,990 B2, FIG. 5a), which seems to be simpler to produce and to control. Indeed, if the parameters of the system are well designed, only one electric signal (with respect to the ground) is needed here to create and to control the lens. The electric potential is applied to the external electric contact 1, while the central end of the ITO is let floating. The opposed substrate bears a uniform transparent electrode that can be grounded.

However, in this approach, to propagate (with gradual decrease) the electric potential to millimetric scales (with typical LC materials, thicknesses of at the order of 50 micrometers), the width w of the ITO lane and the gap g between neighboring ITO lanes must be chosen in a way that the pitch of the ITO pattern (w+g) becomes comparable with the thickness of the LC layer L. In this case, the LC material's reaction will be abrupt (step wise between the zones with and without ITO) since the corresponding fringing field will not be able to «smoothen» the electric field between ITO lanes. This will create light scattering and degradation of its wavefront. This is demonstrated in the photo of FIG. 5b. To obtain this photo, the LC cell (with unidirectionally oriented nematic LC, or NLC, sandwiched between two substrates one bearing a uniform ITO and the second one bearing a spiral shaped ITO) was placed between crossed polarizer and analyzer. Light passing through the polarizer enters into the LC cell and generates two polarization modes (ordinary and extra ordinary). They propagate with different phase delays, which depends upon the transversal position of observation: more the molecules are reoriented less the phase delay is. For a parabolic profile of molecular reorientation, the analyzer will allow the transmission of light or block it depending upon the local phase delay. This generates concentric rings the distance between which is showing the 2πc phase delay between the two polarization modes. Thus, the phase profile of light (passing through the lens) is visualized (one half of the device is shown only) here as bright and dark fringes. We can see multiple additional (see hereafter) discrete "mini" fringes due to the above mentioned effect of abrupt changes or discretization (FIG. 5b).

Figure 6A:
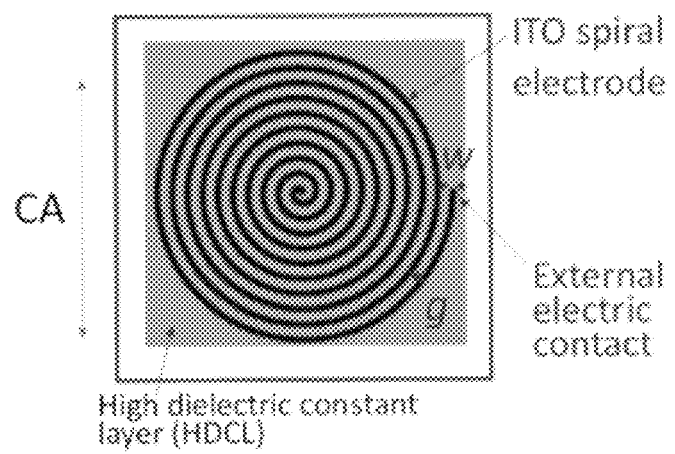
FIG. 6a illustrates a schematic top view of a lens with spiral shaped ITO electrode having additionally a relatively high dielectric constant layer (HDCL) in accordance to an embodiment of the present disclosure.
Figure 6B:
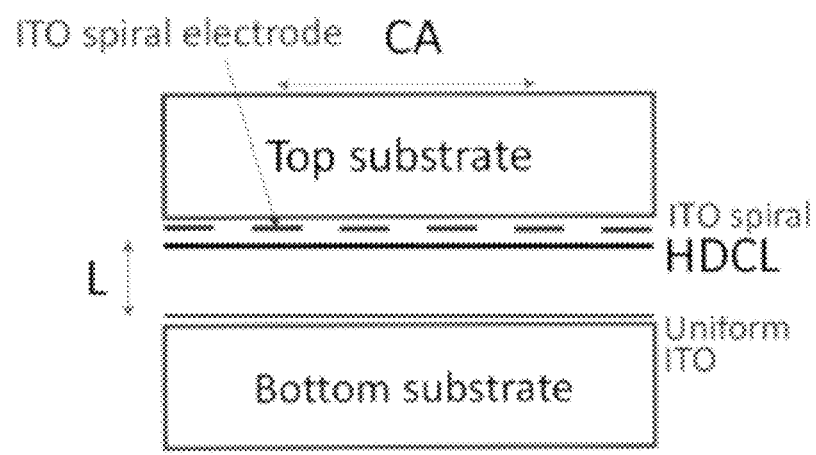

To resolve the above-mentioned problem of wavefront degradation, we propose the use of a relatively high dielectric constant layer (HDCL), including the real, imaginary or both components. The proposed HDCL must be cast near the ITO pattern (e.g., cast under or above the patterned ITO layer, FIG. 6a and FIG. 6b). Its dielectric constant s may preferably be in the range of $\varepsilon=20$ or above to be used for the range of CAs we are interested in. As a reference, air has $\varepsilon=1$ and most polymers and glass materials have s in the range of 4 to 6.

Figure 5B:
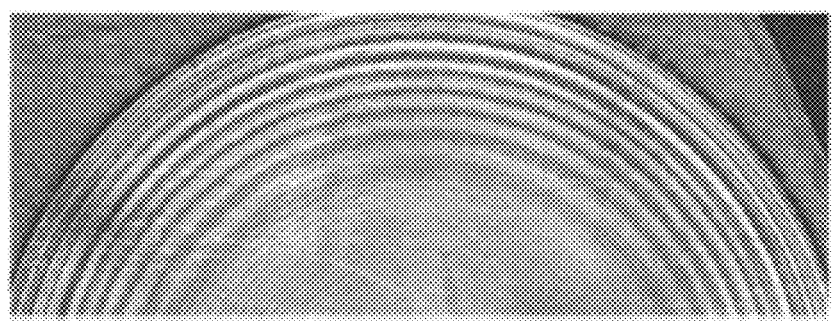
Figure 6C:
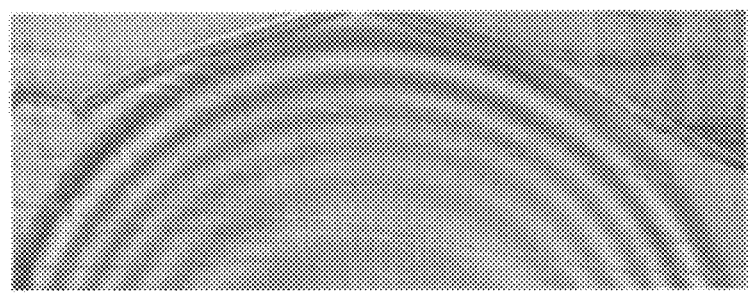
FIG. 6c is an experimental micro photography of the lens with spiral shaped ITO electrode having a HDCL, shown in FIG. 6a, demonstrating the softened wavefront (or phase) modulation.

Experimental verification demonstrates that the proposed HDCL indeed smoothens the electric potential's profile and makes the light wavefront acceptable for imaging applications (see the photo of FIG. 6c, obtained in the same conditions and with the same device as the one shown in the photo of FIG. 5b, but a 100 nm thick $Ti_3O_5$ was cast on the patterned, spiral-shaped, ITO). In contrast to the WCL, there are many industrially well-mastered optical materials with high e (see, e.g., J. Robertson, High dielectric constant oxides, Eur. Phys. J. Appl. Phys. 28, 265-291 (2004)). Thus, other solid material candidates (for the HDCL) may be other metal oxides, such as Hafnium Oxide ($HfO_2$), $Ta_2O_5$, $ZrO_2$, etc. The case of $HfO_2$ is particularly interesting and useful since, in addition of having $\varepsilon=20$, it also may be fabricated to have a refractive index that is very close to the refractive index of ITO. This may enable the fabrication of index matched layers that would minimize Fresnel reflections from the combined layer of the ITO and HDCL (since the ITO layer will be optically "hidden").

We can also find some photopolymerizable LC materials which have high $\varepsilon$ (often they are anisotropic, so $\varepsilon_{\parallel}$ and $\varepsilon_{\perp}$ are different and their difference $\Delta\varepsilon \equiv \varepsilon_{\parallel} - \varepsilon_{\perp}$ can be rather high, well above 10).

Thus, in a first embodiment, to obtain millimetric scale devices with gradually changing electric field we propose to use a high dielectric constant material layer in the close proximity to the pattern of the ITO electrodes (under or above).

In a different embodiment, the substrate, that is bearing the ITO spiral, can itself be a material with high value of $\varepsilon$. In some embodiments, the HDCL material may be located between the glass substrate and the ITO.

In a different embodiment, the LC materials can itself be a material with high value of s. In some embodiments, the HDCL functions may be performed by an alignment layer with high dielectric constant s which may be generally cast over the ITO.

In a different embodiment, the HDCL material can be a combination of layers.

Figure 7A:
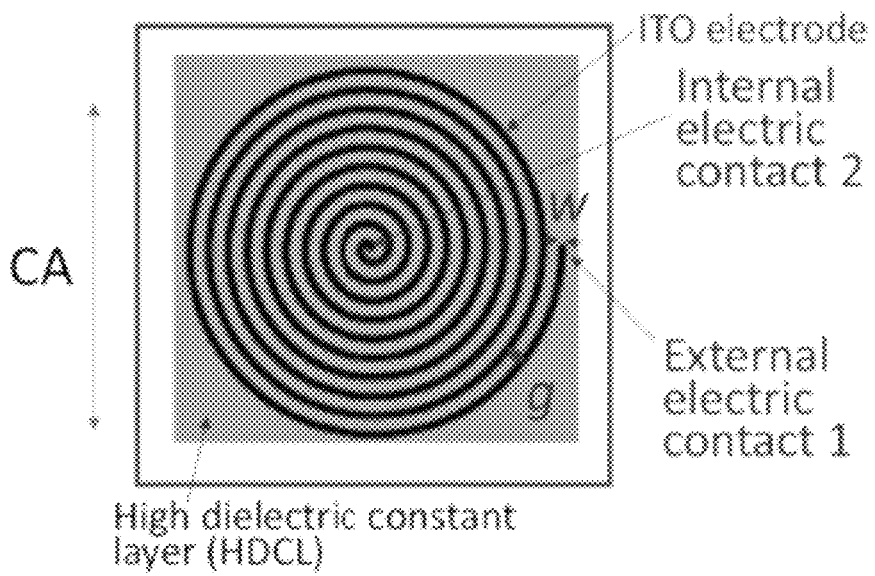
FIG. 7a illustrates a schematic top view of a spiral shaped ITO electrode optionally having a relatively high dielectric constant layer (HDCL) wherein the substrate has an electric via in the center of the top substrate allowing a second electric contact from the opposite side of that substrate in accordance to an embodiment of the present disclosure enabling phase shifted drive (PSD) as well as bipolar operations with positive or negative optical powers.
Figure 7B:
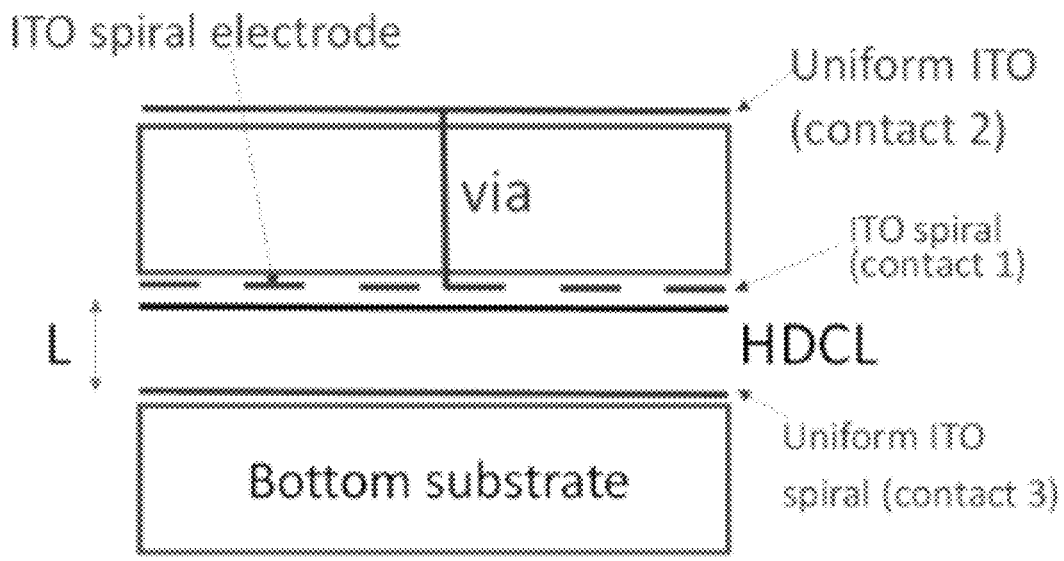

In a different embodiment, the substrate, that is bearing the ITO spiral, can contain a transparent electrode (preferably relatively far from the spiral, e.g., on the external surface of the substrate, FIG. 7a and FIG. 7b) that is connected to the central point of the inner spiral electrode (by a via, small hole, etc.). In this case, the application of the high potential to the inner electric contact (here No. 2) will generate stronger field in the center of the device. This will allow to create a lens with inversed or "negative" optical power (defocusing light instead of focusing). This will allow increasing the total dynamic range of optical power variations by creating first positive and then negative lens by the same device (if, e.g., we start by applying high potential at contact 1, then reduce it and then apply high potential on contact 2, etc.).

In one embodiment, the dielectric thickness of that substrate (defined by the dielectric constant and the real thickness) may be chosen in a way to actively provide the desired value of electrical potential to the center of the device, while avoiding influencing the further time averaged transversal distribution of the electrical potential in the volume of the liquid crystal.

In yet another embodiment, the thickness of the substrate may be relatively thin (not too thin, e.g., between 50 micrometers to 200 micrometers) such that the electrode on the top of that substrate may be kept floating and without making connection to the center of the spiral. This architecture may help for further smoothening of the time averaged transversal electric field distribution in the volume of the liquid crystal.

In another embodiment, PSD signals with various potentials ($U_1$ and $U_2$) can be applied simultaneously on contacts 1 and 2 with specific phases ($\Phi_1$ and $\Phi_2$) and offsets, which will allow the additional re-shaping of the distribution of the electric potential in the transverse plane (containing the spiral) and in the area filled by NLC.

Figure 8A:
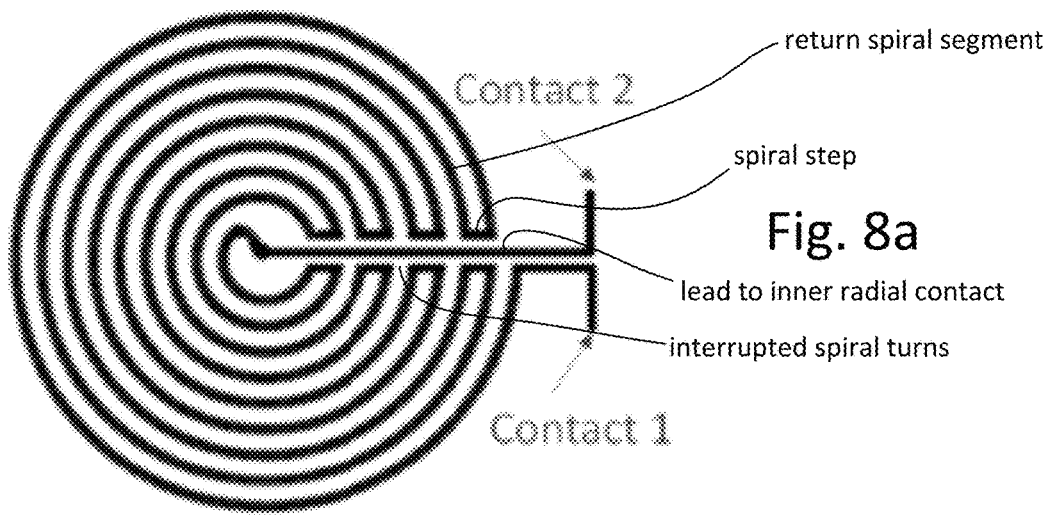
FIG. 8a illustrates a schematic top view of a spiral-shaped electrode in accordance with one embodiment of the present disclosure having an ITO pattern allowing a second (inner or central) contact on the same substrate enabling PSD as well as bipolar operations with positive or negative optical powers.

Alternatively, in a different embodiment, the pattern of the ITO spiral may be rearranged in a way to create the second (inner or central) contact on the same substrate, FIG. 8a. The small area used to bring the second contact to the center should be as narrow as possible to avoid the additional degradation of light wave front.

This design also will allow the creation of a bipolar (positive or negative) lens (by respectively providing lower or higher potential to the contact 2, which, in the second case, will generate higher electric field in the center of the lens), and thus enable larger dynamic range of total optical power variation. Indeed, for the same LC layer, we can also obtain a positive lens by applying higher potential to the contact 1 (which will generate higher electric field in the periphery of the lens).

As shown in FIG. 8a, the outer contact 1 connects to the outer portion of the spiral serpentine electrode. The first spiral segment is an arc that stops near the lead to the inner radial contact where a spiral step segment is located. The return spiral segment then follows another arc of smaller radius to the opposed side of the lead to the inner radial contact.

The use of a high dielectric constant material (not shown here only for the sake of simplicity) is optional here, but it can additionally help if applied.

Figure 8B:
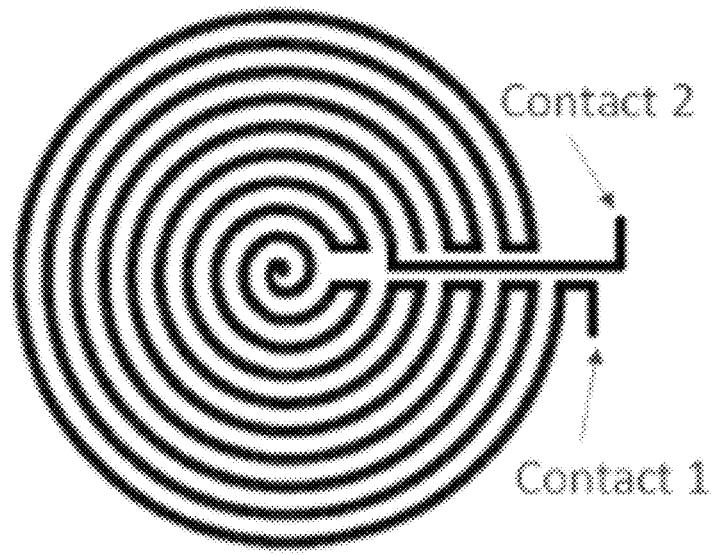
FIG. 8b illustrates a schematic top view of an electrode in accordance with one embodiment of the present disclosure having an ITO pattern allowing the control of two segments (internal and external) for a Refractive-Fresnel type operation.

In another embodiment, this "cut-line" approach can be used also to create segmented electrode zones (e.g., 2), similar to refractive Fresnel lenses FIG. 8b. In this case, the contact 1 will control the external zone of the lens while the contact 2 will control the internal zone of the lens. Here also, the use of a high dielectric constant material is optional.

Figure 8C:
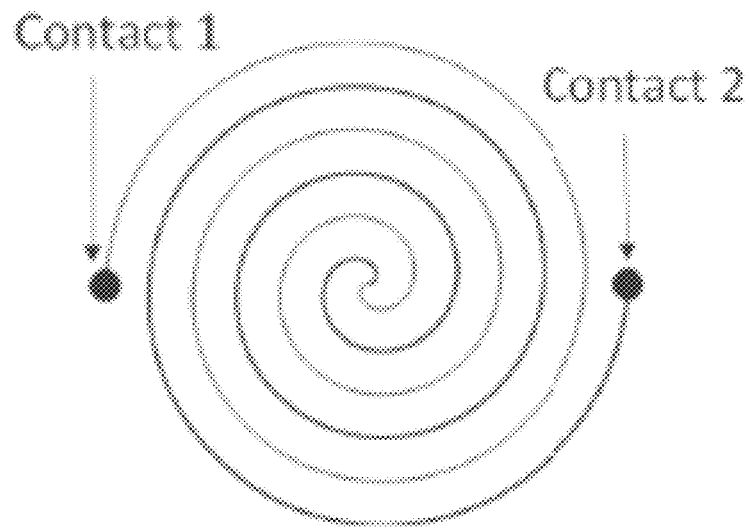
FIG. 8c illustrates a schematic top view of an electrode in accordance with one embodiment of the present disclosure having an ITO pattern with an Archimedean spiral enabling PSD operations.

In some embodiments, as illustrated in FIG. 8c, the electrode structure may be an Archimedean spiral which may include two contact points, one at each end of the spiral. This may use similar control signals and effects as the embodiments of FIGS. 8a and 8b.

Figure 8D:
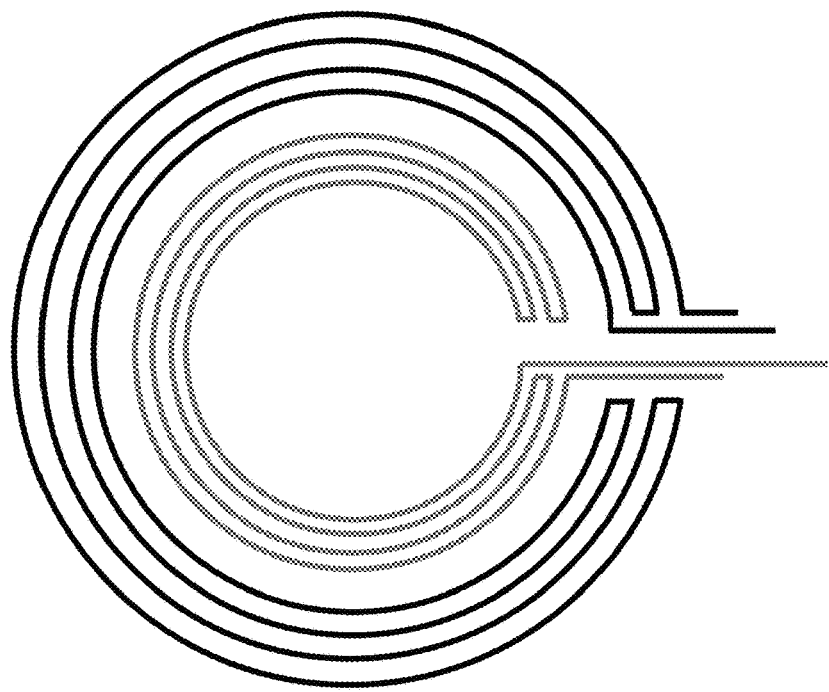
FIG. 8d illustrates a schematic top view of an electrode in accordance with one embodiment of the present disclosure having an ITO pattern with segmented rings enabling their independent operations.
Figure 8E:
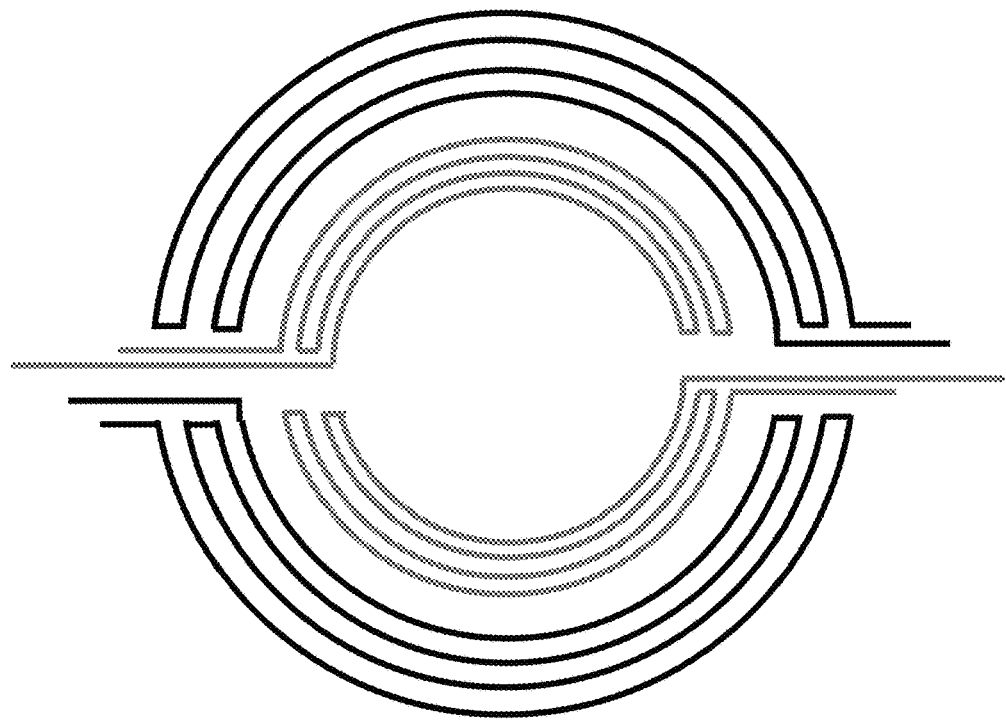
FIG. 8e illustrates a schematic top view of an electrode in accordance with one embodiment of the present disclosure having an ITO pattern with segmented arcuate shapes enabling a better control and operations.
Figure 8F:
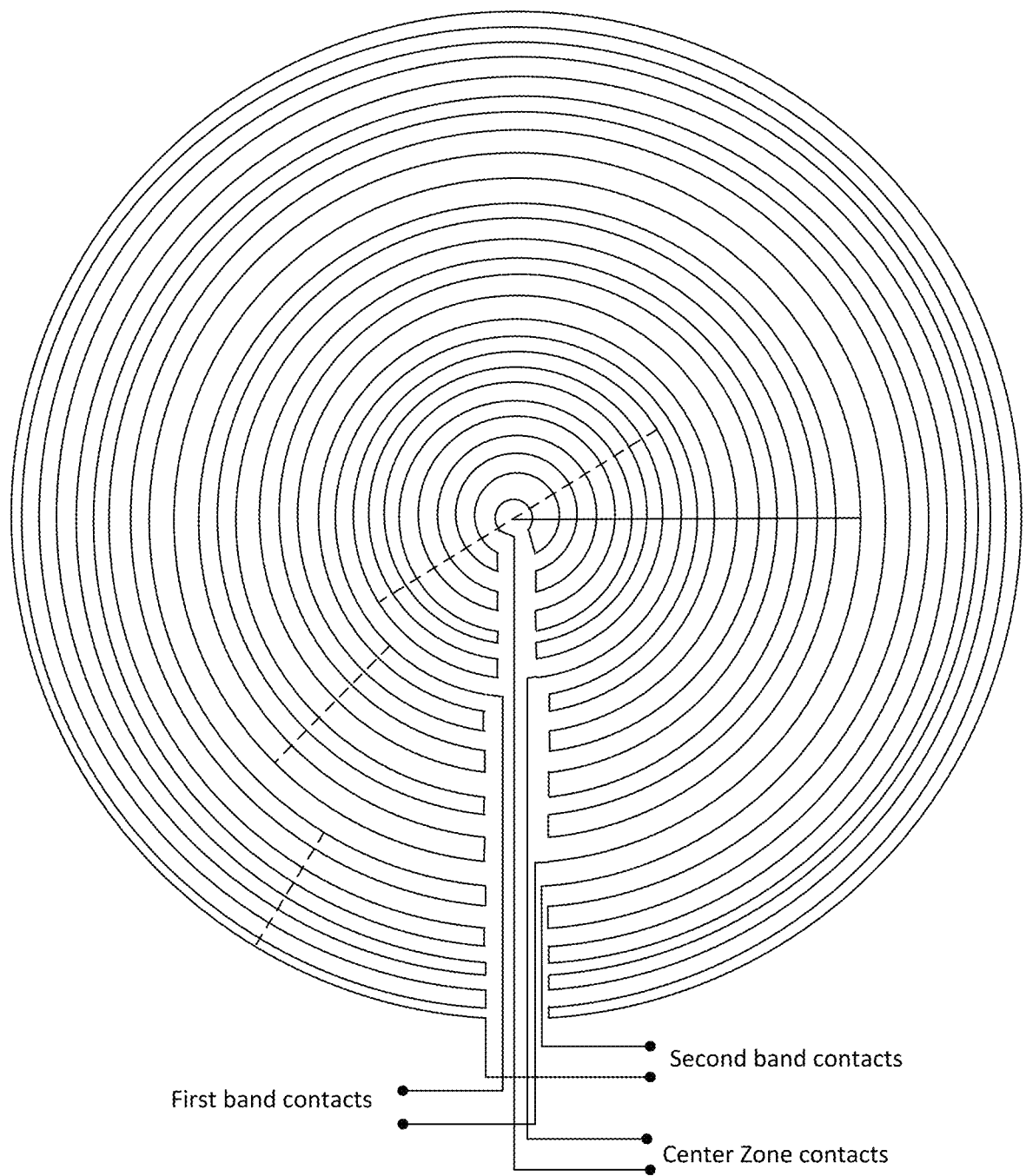
FIG. 8f illustrates a schematic top view of an electrode in accordance with one embodiment of the present disclosure having an ITO pattern for creating a Fresnel lens having three separate zones, each having 2 control electrodes at zone extremities enabling a better distribution of the electrical potential in the transverse plane (i.e., inside the liquid crystal volume) as well as both positive and negative optical powers.

Similarly, a person skilled in the art will appreciate that any number of variations of electrode structures may be made, such as providing more than one Fresnel zone (i.e. bands of the lens surrounding the central aperture) without departing from the teachings of this disclosure. FIGS. 8d to 8f presents various embodiments of such electrode structures. FIG. 8d illustrates a Fresnel lens structure comprising an outer band electrode and a central electrode structures, each having two contact points being operable to be driven by its own driving signal. In such embodiments, it may thus be possible to independently control the inner central zone and any bands of an outer zone. The presence of two extreme contacts (e.g., contacts at each extremity) for each segment may be significantly beneficial. Indeed, in addition of allowing a better control over the special profile of the electric potential, also it may further allow a "bipolar" operation (generating lenses with both positive and negative powers) of the lens.

In the embodiment of FIG. 8e, the outer band electrode and the central electrode may each be separated into two or more distinct segments (e.g. an upper and a lower part). Each segment may then have two contact points which may be driven by their own driving signals. As such, the exemplary embodiment of FIG. 8e may have eight contact points. A person skilled in the art will appreciate that any number of bands may be added by adding outer electrode structures and that any of the electrode structures may be separated in multiple segments. Additionally, it will be understood that the electrode structures of each band do not necessarily have to be the same with regards to the other bands (i.e. they may have different width, pitch, number of segments, etc.). Moreover, the electrode structures may have more than two contact points, which may be particularly useful for serpentine electrodes having longer continuous electrode segments.

The segmentations of the electrode structure may be particularly beneficial when the size of the element is large and the attenuation of the electric potential is strong.

FIG. 8f illustrates an embodiment of a Fresnel lens serpentine electrode structure having three zones (i.e. a central aperture, a middle band and an outer band). Each serpentine electrode segments, one for each of the zone, may have two contact points which may be driven by their own separate driving signals. While illustrated as being circular patterns, the electrode structure shown in FIG. 8f could be separated in multiple segments, as illustrated in FIG. 8e, or deformed, e.g., with some ellipticity, etc.

By combining certain elements of the electrode structures as described so-far, it may be possible to build large diameter devices which may be used not only for accommodative vision and adaptive imaging, but also for dynamic lighting applications. Depending on the electrode segments being activated (e.g. higher voltage on the outer bands and lower for the central electrode, or the opposite) it may become possible to focus and defocus an incident light. It may further be possible to activate various segments of the multiple electrode structures (e.g. segments within a band and/or different bands) such as to create complex light manipulation (e.g. beam steering, broadening/focusing, etc.).

When using such spiral electrodes to create the zones of a Fresnel liquid crystal lens, the electrode provided on the opposed liquid crystal cell substrate can be a uniform electrode or a similar spiral electrode arrangement. In the case of a uniform electrode, it can be an arrangement of electrodes such as a central disc and one or more concentric bands arranged around the central disc. With each electrode in the arrangement separately driven, it is then possible to power a spiral electrode and its opposed uniform electrode element without powering or grounding the neighboring electrodes so as to reduce the electric field from extending from the powered zone into the unpowered zone.

The addition of the second contact in FIGS. 8a to 8f may also enable the use of various PSD driving techniques, including the case, when, for example, the high voltage is provided to one contact ($U_1$), while the second one is ground (and $U_2$=0). The voltage distribution will be different (and thus the properties of the lens will be different) if that second contact is kept «floating» (not ground). Even more interesting here is the case, when we apply different voltages (say, $U_1$ and $U_2$) with different phases, $\Phi_1$ and $\Phi_2$, and offsets.

The same PSD approach of applying different voltages and phases can be used to obtain various potential distribution in any other embodiment of this invention where a serpentine electrode structure is used to obtain the desired spatial profile of the electric potential. Here also, the use of a high dielectric constant material is optional.

Such a PSD approach has been already demonstrated to obtain lensing effect (Andrew K. Kirby, Philip J. W. Hands, and Gordon D. Love, Liquid crystal multi-mode lenses and axicons based on electronic phase shift control, 17 Oct. 2007/Vol. 15, No. 21/OPTICS EXPRESS 13496). In that demonstration, two substrates are bearing uniform ITO layers. In its simplest demonstration, for the case of a cylindrical lens, the bottom substrate of an LC cell may be grounded while the top substrate may have two contacts at the opposed corners and the voltages (here sinusoidal), applied to those corners, are phase shifted at φ. This phase shift (e.g., for φ=180°), generates a drop of the electrical potential from the periphery of the device (U=6.3V) to the center of the device (U=0V), generating thus a corresponding molecular reorientation pattern. Various modifications of this device are possible, including the change of φ and/or adding a bias voltage.

In a different embodiment, the width w of the ITO spirals or their separation g or both of those parameters may be spatially varied (chirped) in a linear or nonlinear way to additionally shape the electric field across the transvers plane of the device (in all previous and following electrode designs). The value of s of the HDCL may be further optimized for these varying patterns of ITO. The dielectric parameters of the LC as well as its thickness must also be taken into account in this optimization.

In a different embodiment, as already mentioned above, the combination of two similar substrates (with or without the HDCL) can be used to build a LC cell (or sandwich).

To improve the performance of the lens, we may offset the potential of one contact with respect to the second contact. This may be done also by using a combination of electrical signals, for example, one high frequency and one low frequency, on one of couples of electrodes (cast on the same substrate) with respect to other couple of electrodes (cast on the opposed surface).

While the serpentine electrode structure alone may achieve a spatial distribution of the electric field sufficient to create a lens at the desired location, a high dielectric material coating may be added over the electrode network, such as to smooth the electric field. The high dielectric constant material layer can comprise, for example, a layer of Ti3O5 100 nm thick having a dielectric constant of about 20 or more. An alternative "smoothening" effect can be obtained also if phase-shifted signals are applied to the opposed edges of these discrete node electrodes. The combination of both approaches can be beneficial.

The exemplary embodiments of FIGS. 8e and 8f may be used to generate various complex refractive index profiles, particularly when used in "combination" with segmented electrodes. In such embodiments, the periods (or pitches) of the electrodes (defined by their width w and by the gap g between them) may be different for different segments. As described herein, any number of contacts may be used over a length of a serpentine electrode and/or any different control modes may be used. For example, activating a first electrode and letting its second contact as "floating", or activating both ends and alternating their values to generate an average RMS field distribution, adding offset values, etc., may be used.

Figure 9A:
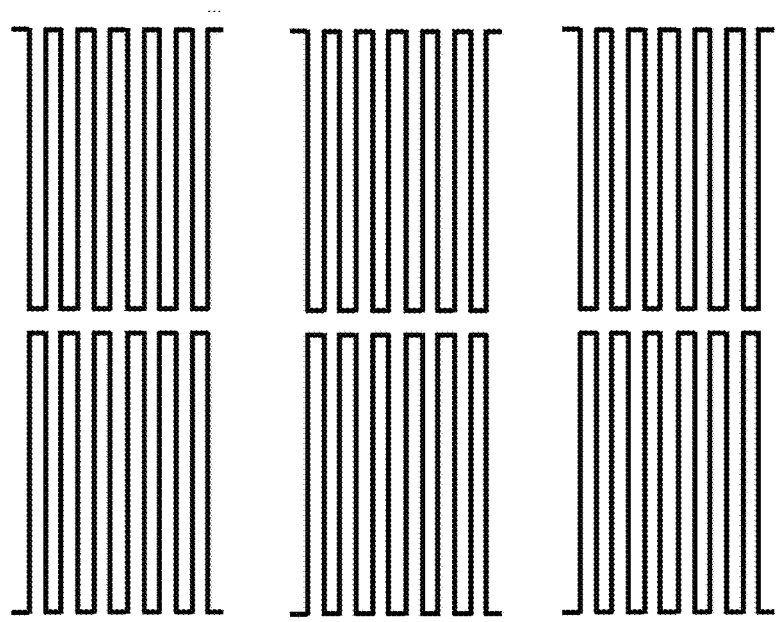
FIG. 9a illustrates a schematic of a number of serpentine electrodes providing multiple separated excitation regions on a single substrate of an LC cell, in accordance with one embodiment of the present invention.
Figure 9B:
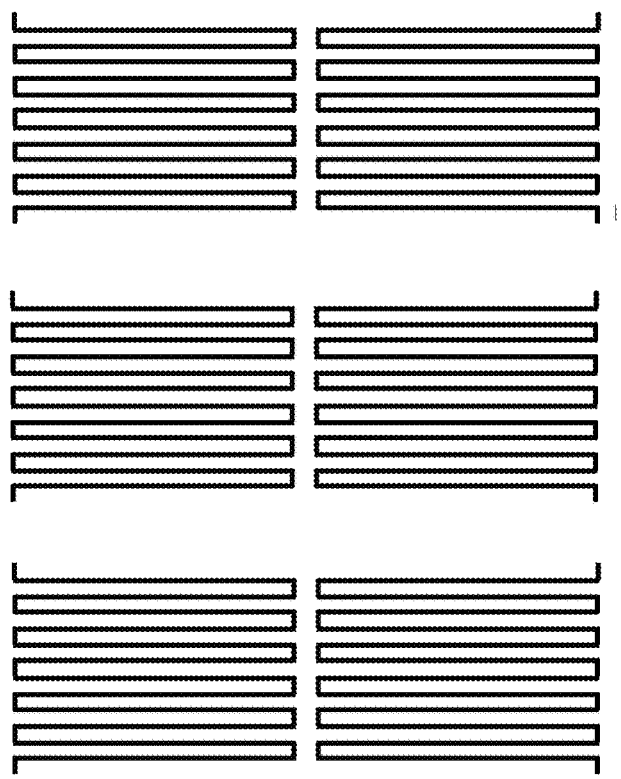

In yet another embodiment, as shown in FIG. 9a, the electrode structure may include a number of separated serpentine electrodes operable to provide multiple separated lensing regions that may be used on a single substrate of an LC cell. FIG. 9b illustrates an orthogonal orientation of a similar serpentine electrode structure as presented in FIG. 9a. As will be further detailed herein, it will be appreciated that each serpentine electrode section of the electrode structure illustrated in FIGS. 9a and 9b may be small (e.g., 0.5 mm wide) and may be repeated over the whole desired lensing surface. Therefore, each serpentine electrode section may be controlled to provide a part of the desired lens being created. As a matter of fact, using small enough serpentine electrode sections, each separated by a small gap and being individually controllable, may provide the ability to create various lens shapes with various lensing parameters.

Figure 11A:
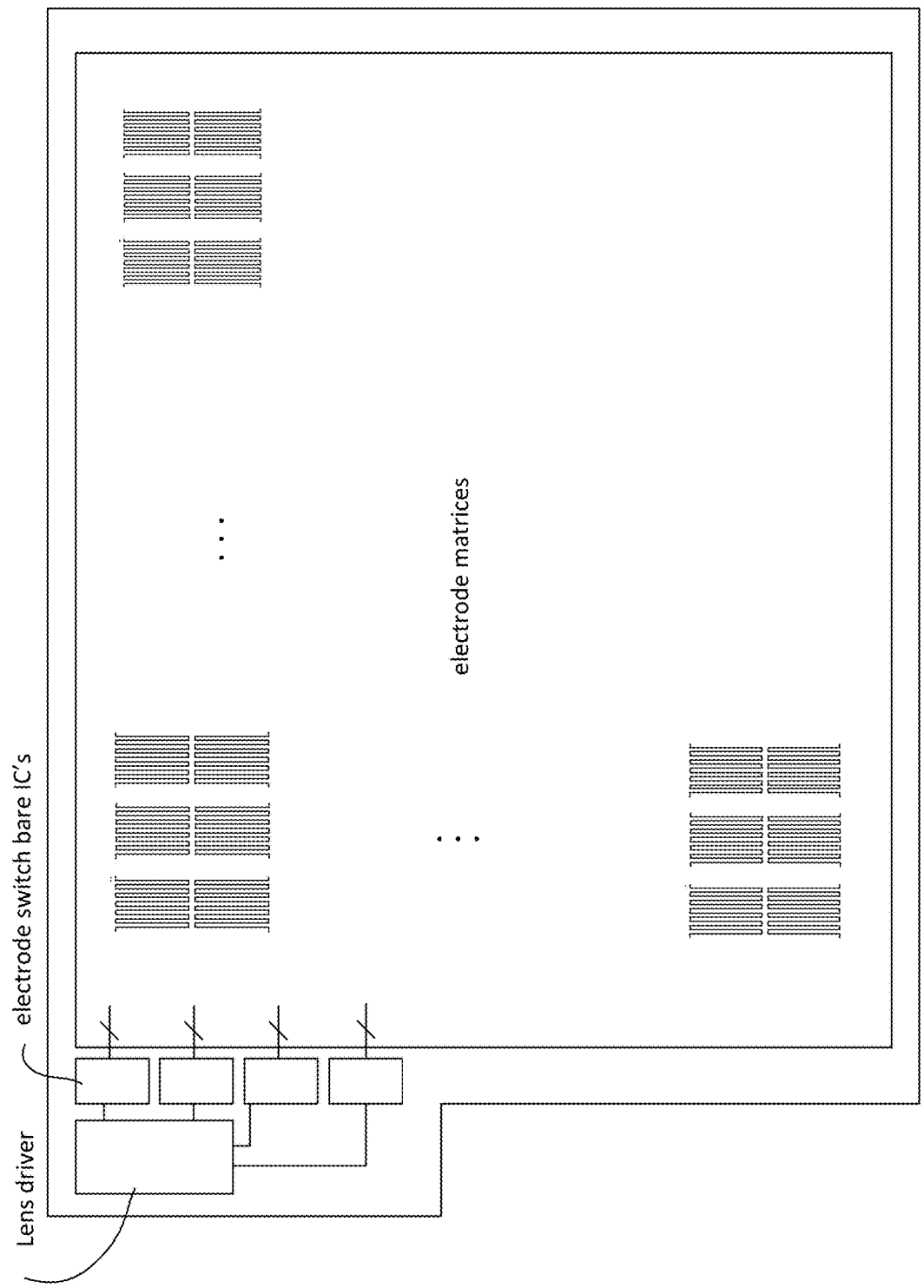
Figure 11B:
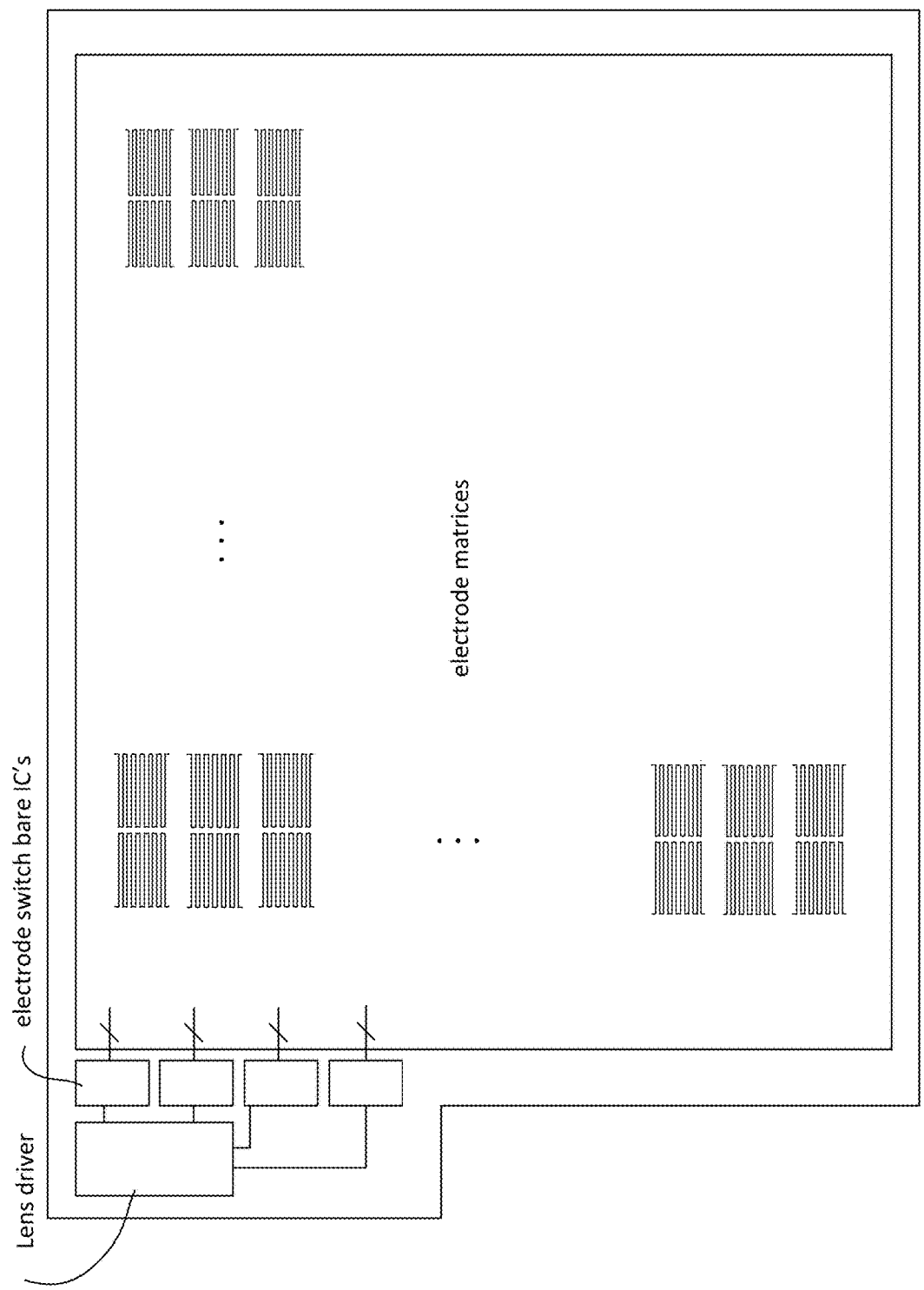

For example, an electrode structure comprising 60 by 80 serpentine electrode sections (i.e. providing a rectangular lensing matrix) may be used to create large "cumulative" optical path differences through the wavefront offsets by independent electrode segments similar to a complex "Fresnel" lens. Each serpentine electrode sections, when controlled with a particular electrical signal at each of its at least two contact points, may provide a desired lens portion (e.g. controlling the voltage at each end of the electrode allows for the creation of any resulting diagonal distribution of electric field, which may affect the liquid crystal layer in such a way as to provide one of the sawtooth sections of a Fresnel lens band). This is best shown in FIGS. 11a and 11b, with FIG. 11b showing the orthogonal direction serpentine electrode sections of a separate layer of LC for providing a Fresnel lens having a spherical lens behavior.

Figure 9C:
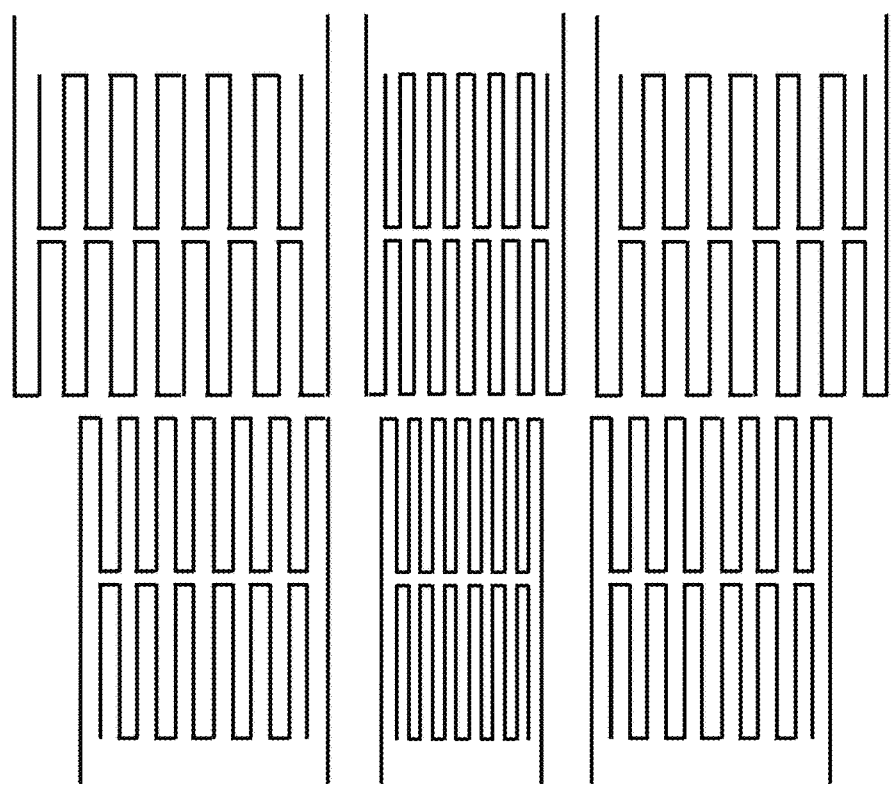
FIG. 9c illustrates a schematic of a number of combined serpentine electrodes, having different pitches for different regions, providing multiple separated excitation regions on a single substrate of an LC cell, in accordance with one embodiment of the present invention.

Similarly, FIG. 9c illustrates a different embodiment of an electrode structure in which a number of combined serpentine electrodes, having different pitches for different regions, provide multiple separated lensing regions that may be used on a single substrate of an LC cell. These segmentations may be beneficial to maintain a desired profile of the electric potential.

The exemplary embodiments of FIGS. 9a to 9c may be used to generate various complex refractive index profiles, particularly when used in "combination" with segmented electrodes with single- or double-sided control electrodes (e.g. FIG. 9c). In such embodiments, the periods (or pitches) of the electrodes (defined by their width w and by the gap g between them) may be different for different segments. As described herein, any number of contacts may be used over a length of a serpentine electrode and/or any different control modes may be used. For example, activating a first electrode and letting its second contact as "floating", or activating both ends and alternating their values to generate an average RMS field distribution, adding offset values, etc., may be used.

It will be appreciated that the electrode pattern presented in FIGS. 9a and 9b allows the generation of gradients mainly in the horizontal direction (e.g., from the center to the periphery) if the electric potentials are matched $U_1=U_3$; $U_2=U_4, \ldots U_{10}=U_{12}$. Among others, such segmentation may be beneficial to avoid asymmetry effects due to the too strong attenuation of the electric potential, e.g., in large scale applications with rather high sheet resistance ρ of electrodes used. The same structure can also generate gradients in the vertical direction if the potentials are not matched. In the same time, the electrode patterns of FIG. 9c may further allow generating more complex patterns of refractive index gradients in the vertical direction and in the horizontal directions.

It will be appreciated that similar electrode structures may be used in a second LC cell stacked with the first LC cell, while using an orthogonal orientation of the electrode structure, as shown in FIG. 9b.

A person skilled in the art will appreciate that using multiple separate regions, each having their own electrode structure comprising any number of serpentine electrode sections which may be of different shapes and characteristics, may be beneficial for creating specific and independently controlled lensing areas, such as the equivalent of bifocal glasses or progressive glasses.

Figure 10:
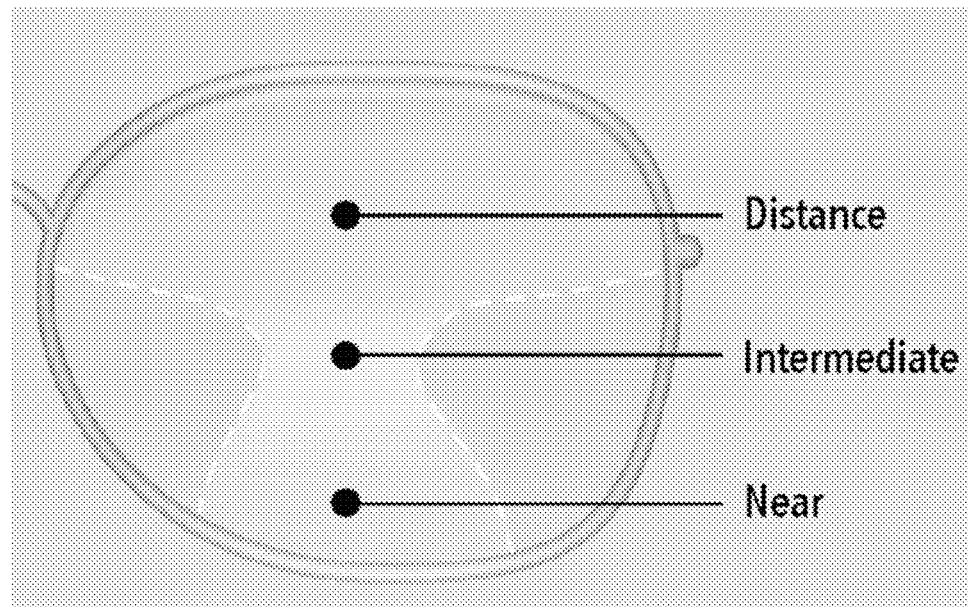
FIG. 10 illustrates one side of an exemplary pair of ophthalmic glasses in which three separate zones may be controlled to provide different optical power.

FIG. 10 illustrates such progressive glasses in which there may be three different areas, each requiring different optical powers and potential lensing structures. For example, the near area may require the potential of creating a Fresnel lens with more bands than the intermediate area. By providing one or more electrode matrices, over the entire or most of the surface of the glasses, using electrode structures as shown in FIGS. 9a to 9c, it may be possible to create different lenses with different characteristics at any desired location. For example, depending on the desired optical power, a Fresnel lens for the near area may be controlled to have more or less bands. As such, the glasses may have one or more tunable lenses over their surface.

It will be understood that, in order to create the desired lenses with the LC cell and electrode structures as described herein, it may be necessary to stack LC cells to fully act on the incident light. For example, a first LC cell may have a first electrode structure orientation and a second LC cell, stacked over the first LC cell, may have a second electrode structure orthogonally oriented with regards to the first electrode structure. Additionally, to act on both light polarization, LC cells with orthogonal orientations of their ground state molecules may be stacked.

Ophthalmic glasses, as illustrated in FIG. 10, may be equipped with any necessary electronics (e.g. microprocessor, memory, I/O, battery, etc.) and sensors to detect a required optical power (at a specific location) and calculate the necessary lens structure to be created over the location. As such, the glasses may be equipped with an eye gaze detector, a lens driver and electrode switches to provide the control signals to the correct electrodes. FIGS. 11a and 11b illustrate an exemplary configuration of such glasses, in which the entire glass surface includes one or more electrode matrices with any number of serpentine electrode sections.

The driving algorithms must be adapted to the application Amplitudes and phases of various electrodes may be actively controlled. Ground or let floating. These electrodes may be subjected to continuous excitation with alternative AC signals (e.g., SINE or SQUARE shaped). Alternatively, as it is well known in the traditional LCD industry (see, e.g., P. J. Collings and J. S. Patel, Handbook of Liquid Crystal Research, Oxford University Press, 1997), the application of time sequenced electrical signals to specific electrode contacts will enable the generation of the lens effect mainly in the desired (restricted in the transverse space) areas of the entire optical window, keeping the rest of the window almost unchanged.

Multiple lenses (positive, negative, cylindrical, axicon, etc.) can also be created and shifted in different positions simultaneously if desired.

Figure 12A:
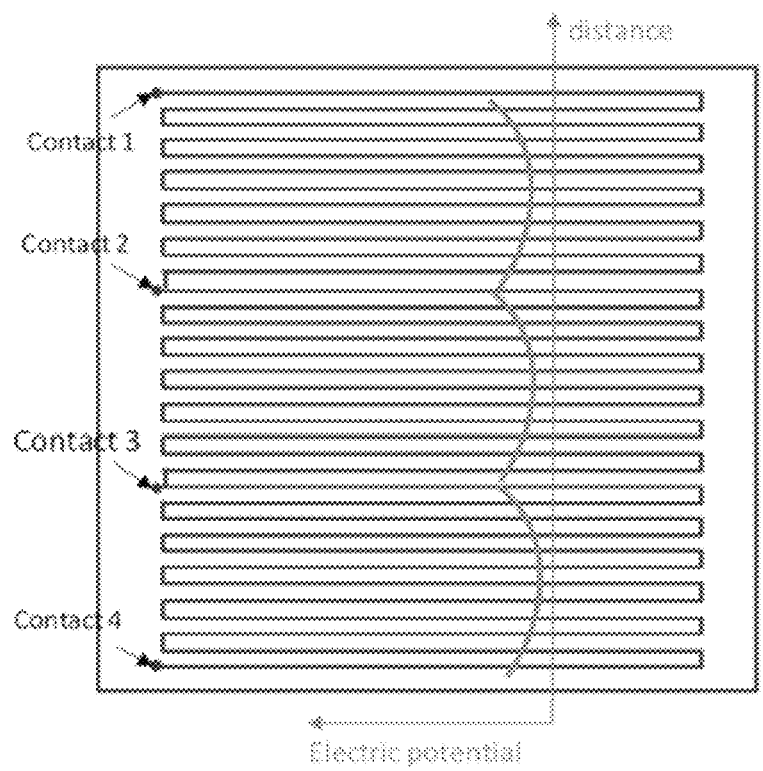
FIG. 12a illustrates an embodiment of the present disclosure wherein the ITO pattern parameters of electrodes (sheet resistance p, width w, gap g of transparent electrodes) as well as the parameters of the LC cell and of the electrical drive signals are adjusted to obtain a symmetric unidirectional drop of potential (between pairs of electrodes 1&2 or 2&3, etc.) and to generate cylindrical lens arrays.

In still another different embodiment, the ITO same pattern may be used to generate also other types of dynamic profiles of electric potential, which may be used to build such components, as prisms or cylindrical lenses. Thus, if the ITO pattern parameters (as well as the parameters of the liquid crystal cell that will use such a pattern along with another electrode) are calculated in a way to drop the electric potential gradually from one contact to the mid way of the next contact, then the same potential may be applied to all electrodes and then we can generate cylindrical lens arrays (FIG. 12*a*). The bold line (in the center-right) represents schematically the corresponding profile of the electric potential.

Figure 12B:
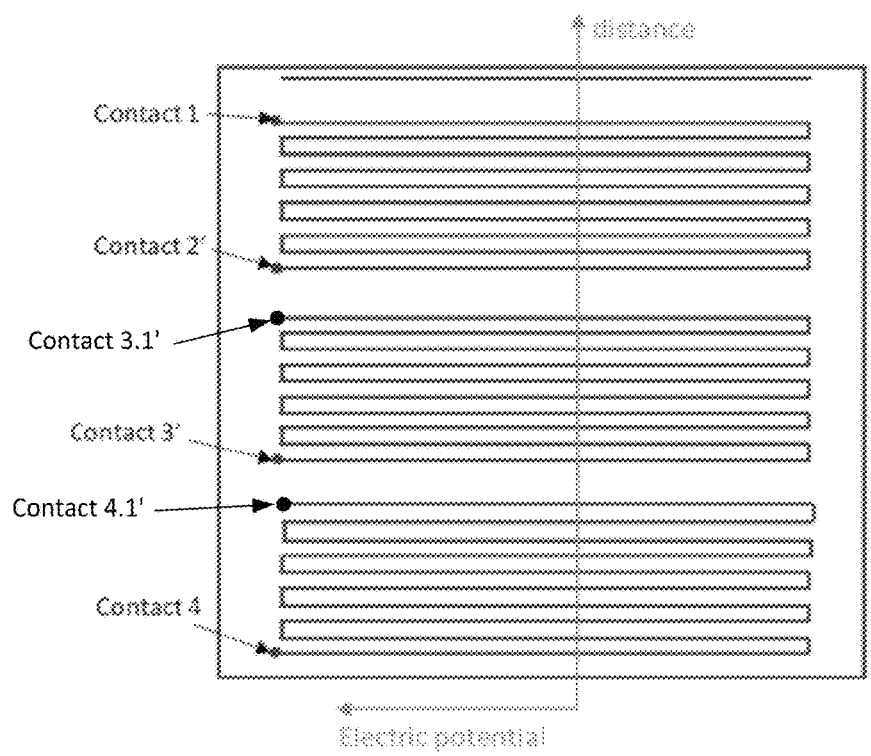
FIG. 12b illustrates an embodiment of the present disclosure wherein the continuity of electrodes is disrupted into segments or zones with two contacts for each segment and the ITO pattern parameters as well as the parameters of the LC cell are adjusted to generate asymmetric drops of the electric potential to generate prism arrays.

In contrast, if we use "double" contacts (just by disrupting the line and by adding neighboring contacts such as in the in-plane-switch geometry, FIG. 12*b*) then we can apply phase shifted signals (to generate alternative current), then we can "force" specific profiles (including linear) of electric potential that may be used, for example, to generate prism arrays (FIG. 12*b*) and light steering. The advantage of this approach with respect to known in the art steering devices is the fact that there will be no leaking current between neighboring electrodes (thanks to the disruption), while the profile of the electric potential will still be controlled by the choice of the resistance $\rho$, width w and the separation g of intermediate electrode lines.

What is claimed is:

1. A liquid crystal gradient index device comprising:
   two opposed substrates containing liquid crystal;
   a spiral serpentine electrode arrangement on a first one of the substrates; and
   an opposed electrode on a second one of the substrates,
   wherein said spiral serpentine electrode arrangement comprises at least two contact points each operable to receive a driving signal, a first one of said at least two contact points being at an outer radial location and a second one of said at least two contact points being at an inner radial location; and
   wherein said serpentine electrode arrangement has a sheet resistance and width to provide over its length a reduction in voltage to provide a suitable electric field spatial distribution without involving resistive bridges.

2. The device as defined in claim 1, wherein a lead connected to said second one of said at least two contacts points interrupts turns of said spiral electrode arrangement with steps and returns in said spiral electrode arrangement.

3. The liquid crystal gradient index device as defined in claim 2, wherein said lead connects, without any via electrical connection or through-hole electrical connection, said second one of said at least two contacts points to an outer radial location of said spiral serpentine electrode arrangement.

4. The device as defined in claim 1, wherein said opposed electrode is a uniform transparent electrode.

5. The device as defined in claim 1, wherein said opposed electrode is a patterned transparent electrode.

6. The device as defined in claim 1, wherein of the spiral serpentine electrode arrangement and the opposed electrode is made of a transparent conductive material.

7. The liquid crystal gradient index device as defined in claim 6, wherein a lead connects, without any via electrical connection or through-hole electrical connection, said second one of said at least two contacts points to an outer radial location of said spiral serpentine electrode arrangement and interrupts turns of said spiral electrode arrangement with steps and returns in said spiral electrode arrangement.

8. The device as defined in claim 6, wherein said transparent conductive material is one of indium tin oxide, zinc oxide and graphene.

9. The device as defined in claim 1, wherein the liquid crystal is a nematic liquid crystal.

10. The liquid crystal gradient index device as defined in claim 9, wherein a lead connects, without any via electrical connection or through-hole electrical connection, said second one of said at least two contacts points to an outer radial location of said spiral serpentine electrode arrangement and interrupts turns of said spiral electrode arrangement with steps and returns in said spiral electrode arrangement.

11. The lens device as defined in claim 1, wherein said spiral serpentine electrode arrangement comprises two or more spiral serpentine electrodes, wherein each of said two or more spiral serpentine electrode comprises at least two contact points each operable to receive a driving signal and wherein a first one of said two or more spiral serpentine electrode defines a central aperture of said lens device and at least a second one of said two or more spiral serpentine electrode defines at least one outer band in a periphery of said central aperture.

12. The liquid crystal gradient index device as defined in claim 11,
   wherein said at least two contact points comprises further comprise at least two inner radius contact points of said first one of said two or more spiral serpentine electrode comprises at least two of,
   wherein said second one of said two or more spiral serpentine electrode comprises said second one of said at least two contact points being at said inner radial location and said first one of said at least two contact points being at said outer radial location; and
   wherein, for each one of said at least two inner radius contact points of said first spiral serpentine electrode and said second one of said at least two contact points of said second spiral serpentine electrode, a lead connects, without any via electrical connection or through-hole electrical connection, said contact point to an outer radial location of said spiral serpentine electrode arrangement and interrupts turns of said spiral electrode arrangement with steps and returns in said spiral electrode arrangement.

13. The lens device as defined in claim 1, wherein said spiral serpentine electrode arrangement comprises capacitively-coupled electrode segments.

14. The liquid crystal gradient index device as defined in claim 13, wherein a lead connects, without any via electrical connection or through-hole electrical connection, said second one of said at least two contacts points to an outer radial location of said spiral serpentine electrode arrangement and interrupts turns of said spiral electrode arrangement with steps and returns in said spiral electrode arrangement.

15. The lens device as defined in claim 1, wherein said spiral serpentine electrode arrangement comprises individually driven electrode segments.

16. The liquid crystal gradient index device as defined in claim 15, wherein a lead connects, without any via electrical connection or through-hole electrical connection, said second one of said at least two contacts points to an outer radial location of said spiral serpentine electrode arrangement and interrupts turns of said spiral electrode arrangement with steps and returns in said spiral electrode arrangement.

17. The lens device as defined in claim 1, further comprising a transparent high dielectric constant layer placed near the spiral serpentine electrode arrangements to extend the fringing field and to reduce the optical losses.

18. The liquid crystal gradient index device as defined in claim 17, wherein a lead connects, without any via electrical connection or through-hole electrical connection, said second one of said at least two contacts points to an outer radial location of said spiral serpentine electrode arrangement and interrupts turns of said spiral electrode arrangement with steps and returns in said spiral electrode arrangement.

19. A liquid crystal gradient index device comprising:
two opposed substrates containing liquid crystal;
a plurality of linear serpentine electrode sections forming a first arrangement on a first one of the substrates; and
an opposed electrode on a second one of the substrates,
wherein said first arrangement comprises contact points for each of said plurality of linear serpentine electrode sections each operable to receive a driving signal for imparting an electric field profile to form a portion of a linear Fresnel lenslet within said liquid crystal; and
wherein at least one of said a plurality of linear serpentine electrode sections has a sheet resistance and width to provide over its length a reduction in voltage to provide a suitable electric field spatial distribution without involving resistive bridges.

20. The lens device as defined in claim 19, wherein said opposed electrode comprises a plurality of corresponding uniform electrode sections.

21. The lens device as defined in claim 19, wherein said opposed electrode comprises a plurality of corresponding serpentine electrode sections.

22. The lens device as defined in claim 19, wherein said each electrode sections have at least one external contact to receive the driving signal.

23. The lens device as defined in claim 19, wherein said each electrode sections are disrupted and have two external contacts to receive the driving signal.

24. A liquid crystal gradient index device comprising:
two opposed substrates containing liquid crystal;
a transparent spiral serpentine shaped electrode arrangement on a first one of the substrates; and
an opposed electrode on a second one of the substrates,
wherein said spiral serpentine electrode arrangement comprises one external contact point operable to receive a driving signal and at least one electrode of said transparent spiral serpentine shaped electrode arrangement is in proximity of a high dielectric material; and
wherein said transparent spiral serpentine shaped electrode arrangement has a sheet resistance and width to provide over its length a reduction in voltage to provide a suitable electric field spatial distribution without involving resistive bridges.

25. The device as defined in claim 24, wherein the second substrate further comprises an electrode pattern of a different shape.

26. The device as defined in claim 24, wherein the first substrate is thin and further comprises a floating transparent conductive layer on an external surface.

\* \* \* \* \*